United States Patent
Sharpe et al.

(10) Patent No.: US 11,599,478 B2
(45) Date of Patent: *Mar. 7, 2023

(54) REDUCED INSTRUCTIONS TO GENERATE GLOBAL VARIABLE ADDRESSES

(71) Applicant: MICROSOFT TECHNOLOGY LICENSING, LLC., Redmond, WA (US)

(72) Inventors: Todd Edward Sharpe, Redmond, WA (US); Ten Tzen, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,654

(22) Filed: Apr. 22, 2022

(65) Prior Publication Data

US 2022/0245068 A1 Aug. 4, 2022

Related U.S. Application Data

(63) Continuation of application No. 15/865,148, filed on Jan. 8, 2018, now Pat. No. 11,321,236.

(51) Int. Cl.
*G06F 12/1009* (2016.01)
*G06F 12/02* (2006.01)
*G06F 8/41* (2018.01)

(52) U.S. Cl.
CPC ............ *G06F 12/1009* (2013.01); *G06F 8/41* (2013.01); *G06F 8/443* (2013.01); *G06F 12/0223* (2013.01); *G06F 2212/65* (2013.01); *G06F 2212/7201* (2013.01)

(58) Field of Classification Search
None
See application file for complete search history.

(56) References Cited

U.S. PATENT DOCUMENTS

| 5,787,284 | A | * | 7/1998 | Blainey | ............... | G06F 9/44557 |
|---|---|---|---|---|---|---|
| | | | | | | 717/144 |
| 5,850,549 | A | * | 12/1998 | Blainey | .................. | G06F 8/433 |
| | | | | | | 717/159 |
| 7,069,548 | B2 | * | 6/2006 | Kushlis | .................. | G06F 8/441 |
| | | | | | | 717/151 |
| 7,765,534 | B2 | * | 7/2010 | Archambault | ........ | G06F 8/4442 |
| | | | | | | 717/157 |
| 2004/0128662 | A1 | * | 7/2004 | Eisenberg | ............... | G06F 8/445 |
| | | | | | | 717/159 |
| 2007/0113187 | A1 | * | 5/2007 | McMullen | .......... | G06F 21/6218 |
| | | | | | | 715/742 |

(Continued)

*Primary Examiner* — Philip Wang
*Assistant Examiner* — Rongfa P Wang

(57) ABSTRACT

In order to reduce the number of instructions that the compiler generates to load the address of a global variable into a register, the compiler uses a technique that analyzes the global variables used in each function in order to estimate which global variables will be located within the same memory page and have a common base address. A base global variable is selected for each function whose address is fully resolved. The address of each subsequent global variable is constructed using an offset relative to the address of the base global variable that is based on the subsequent global variable's position in a global variable order list.

20 Claims, 7 Drawing Sheets

(56) References Cited

U.S. PATENT DOCUMENTS

| | | | |
|---|---|---|---|
| 2010/0095373 A1* | 4/2010 | Levenshteyn | G06F 21/6218 |
| | | | 717/102 |
| 2016/0266896 A1* | 9/2016 | Fan | G06F 11/36 |
| 2017/0123790 A1* | 5/2017 | Gupta | G06F 11/3604 |
| 2018/0260193 A1* | 9/2018 | Polisky | G06F 8/33 |
| 2022/0350988 A1* | 11/2022 | Shoshan | G06V 20/00 |

* cited by examiner

REDUCED INSTRUCTIONS TO GENERATE GLOBAL VARIABLE ADDRESSES

CROSS-REFERENCE TO RELATED APPLICATIONS

This is a continuation of application Ser. No. 15/865,148 filed on Jan. 8, 2018, entitled "REDUCED INSTRUCTIONS TO GENERATE GLOBAL VARIABLE ADDRESSES", the entirety of which is incorporated by reference.

BACKGROUND

A Reduced Instruction Set (RISC) architecture uses simple instructions that execute in a single clock cycle which results in faster execution speed for a program. RISC architectures commonly use fixed-length instructions which simplifies fetching and parsing the instructions. However, fixed-length instructions limit the flexibility of the instruction set to load large values in a single operation. Most RISC architectures use 32-bit fixed length instructions. A 32-bit instruction cannot load a 32-bit address into a register. There are bits in the instruction that identify the instruction's opcode and a destination register. In order to compensate for this deficiency, two or more instructions are needed to load a 32-bit address into a register. One instruction may load a lower portion of the address and a second instruction may load an upper portion of the address. When a program performs multiple memory accesses that require 32-bit addresses, the execution speed of the program may be hampered by the number of redundant instructions needed to access these memory locations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A compiler generates instructions for a RISC-based architecture that uses fixed-size instructions that are not sufficient to address global variables having 32-bit addresses. The compiler analyzes a program to produce a layout graph that includes the calling relationships between each function in the program and which calculates the frequency of use of each global variable in a function. The layout graph is used to generate a global variable order list which ranks all the global variables in an order that is used to predict which global variables will be stored in close proximity to each other, such as on the same memory page. Those global variables that are meet certain criteria are aggregated into a group that reflects those global variables likely to be situated in the same memory page.

A global variable in each group is selected as the base global variable whose address is fully resolved. The addresses of the remaining global variables in the group are relative to the address of the base global variable. An offset is generated for each remaining global variable that is based on the difference in position of each remaining global variable from the position of the base global variable in the global variable order list. The offset is added to the address of the base global variable to generate the address of the remaining global variable.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
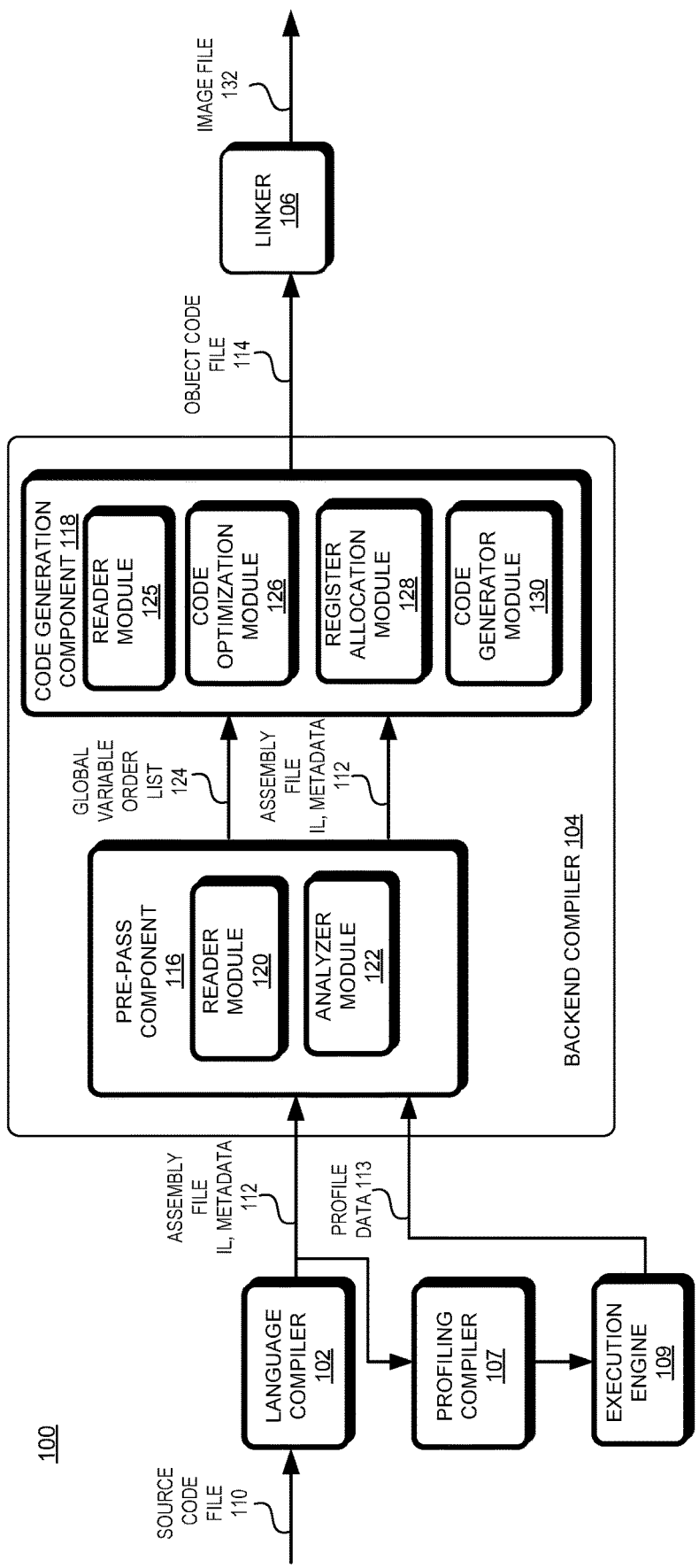
FIG. 1 illustrates an exemplary system for generating a reduced number of instructions to load the address of a global variable.

The subject matter disclosed pertains to a technique that generates instructions to load the address of a global variable in a manner that minimizes the number of instructions that are generated to perform this operation. A compiler translates high level program statements into machine language instructions for a target processor. In order to reduce the number of instructions that the compiler generates to load the address of a global variable into a register, the compiler uses a technique that estimates the global variables that are likely to be located within close proximity to each other at runtime, such as on the same memory page.

A single instruction is generated for all the global variables that are likely to be located within the same memory page which serves as a base address for those global variables within the same memory page. A memory page or page is a fixed-length contiguous block of virtual memory. An additional instruction is generated for each global variable within the same memory page that includes an offset that is relative to the base address. In this manner, the compiler generates a reduced number of instructions to load an address thereby resulting in a smaller-sized image file. The smaller-sized image file executes faster and can be used in computing devices with limited memory resources.

A compiler analyzes a program and generates a layout graph containing the calling relationships between each function in the program and a count of the frequency that a global variable is used in a function. The layout graph is used to generate a global variable order list. The global variable order list is a list of all the global variables used in a program ordered in accordance with one or more rules which the compiler uses to predict which global variables would be stored within the same memory page. The global variable list is ordered based on a global variable's weight, alignment, and size.

The compiler then uses the global variable order list to aggregate the global variables into groups. A base global variable for each group is selected based on a criterion that includes the frequency that a global variable is used within a function, a global variable's alignment, and/or the size of the global variable.

In another aspect, profile data can be collected from sample runs of the program that provide the frequency of use of each global variable in each function. This profile data provides runtime weights that can be included in the layout graph, either in addition to the static counts provided by the static analysis of the program performed by the compiler or in place of the static counts.

In one aspect, the technique is applied to architectures using program counter (PC) relative addressing mode. The addressing mode of an architecture specifies how to calculate the effective memory address of an operand, such as a global variable, by using data stored in registers. In PC-relative addressing mode, addresses are relative to the current value stored in the program counter.

The technology presented is described with respect to Advanced RISC Machine (ARM) and ARM64 architectures which utilizes PC-relative addressing mode. However, it should be noted that the technology disclosed herein is not limited to ARM architectures and can be applied to other processor architectures that use fixed-length addresses and other architectures that utilize multiple instructions to load a value into a single register.

The ARM64 instruction set uses 32-bit fixed length instructions. In order to load the address of a global variable into a register a pair of ADRP and ADD instructions can be used in the following sequence:

ADRP<Xd>,<label>

ADD<Xd>,<Xn>,PageOffset(label)

The ADRP instruction computes the 20-bit base memory address of the 4 KB page where the global variable referred to as <label> is stored and its value is written into the register identified by Xd. The ADRP instruction calculates the 20-bit memory address of the 4 KB page by using the current value of the program counter and the offset, <label>, in the instruction. The ADD instruction adds the global variable or label's 12-bit page position, PageOffset(label), to the register identified as Xn and writes the result into the register identified by Xd.

In the scenario where a function of a program references multiple global variables that reside in the same page, there would be multiple ADRP/ADD pairs of instructions. However, the values computed by the ADRP instruction would be the same since the global variables within the same function are often situated on the same memory page. In this case, one ADRP instruction would be needed and the additional ADRP instructions would be redundant. Instead, the compiler generates an ADRP and ADD pair of instructions to load the address of a base global variable which is the first global variable of a group. Subsequent global variables would be addressed by a single instruction that adds an offset to the address of the base global variable. The offset would be the difference in page offsets between a subsequent global variable and the base symbol.

It should be noted that the technique described herein is not limited to the ADRP/ADD pair of instructions. There are other combinations of instructions that can be used to load the address of a global variable, such as a pair of ADRP/STR instructions and a pair of ADRP/LDR instructions.

The following exemplary code shown in Tables One, Two and Three illustrate the technique described herein. Table One shows an exemplary C source code program. Table Two shows the intermediate code representation that a traditional compiler generates and Table Three shows the intermediate code representation that a compiler utilizing the techniques described herein generates.

As shown in Table One, the function main( ) initializes four global variables, global_0, global_1, global_2, and global_3 in lines 3-6. The function initialize( ) uses these four global variables and sets each global variable with new values in lines 9-12.

Table Two shows the corresponding intermediate code language instructions that a traditional compiler would generate. Line 2 is an ADRP instruction that computes the 20-bit base memory address of the 4 KB page where the global variable referred to as global_0 is stored and its value is written into the register x9. The STR instruction in line 4 adds the value of PageOffset(global_0), which is the 12-bit position of the global variable, global_0, in the 4 KB page, with the value stored in register x9. Hence, register x9 contains the address of the global variable, global_0, using two instructions, the ADRP/STR pair of instructions in lines 2 and 4.

Likewise, the address of global_1 is stored in register x10 using an ADRP/STR pair of instructions shown in lines 5 and 7. In line 5, the instruction adrp x10, global_1, computes the 20-bit base memory address of the 4 KB page where the global variable referred to as global_1 is stored and its value is written into the register x10. In line 7, the STR instruction adds the value of PageOffset(global_1), which is the 12-bit position of the global variable, global_1, in the 4 KB page, with the value stored in register x10. Hence, register x10 contains address of the global variable, global_1, using two instructions, the ADRP/STR pair of instructions in lines 5 and 7.

The address of global_2 is stored in register x11 using the ADRP instruction in line 8 and the STR instruction in line 13. In line 8, the instruction adrp x11, global_2, computes the 20-bit base memory address of the 4 KB page where the global variable referred to as global_2 is stored and its value is written into the register x11. In line 13, the STR instruction adds the value of PageOffset(global_2), which is the 12-bit position of the global variable, global_2, in the 4 KB page, with the value stored in register x11. Hence, register x11 contains address of the global variable, global_2, using two instructions, the ADRP/STR pair of instructions in lines 8 and 13.

The address of global_3 is stored in register x12 using the ADRP instruction in line 9 and the STR instruction in line 12. In line 9, the instruction adrp x12, global_3, computes the 20-bit base memory address of the 4 KB page where the global variable referred to as global_3 is stored and its value is written into the register x12. In line 12, the STR instruction adds the value of PageOffset(global_3), which is the 12-bit position of the global variable, global_3, in the 4 KB page, with the value stored in register x12. Hence, register x12 contains address of the global variable, global_3, using two instructions, the ADRP/STR pair of instructions in lines 9 and 12.

TABLE ONE

```
1      main( )
2      {
3        int global_0 = 1;
4        int global_1 = 2;
5        int global_2 = 2;
6        int global_3 = 2;
        ....
7      void initialize( )
8      {
9        global_0=1;
10       global_1=2;
11       global_2=3;
12       global_3=4;
13     }
14     ...
15     }
```

TABLE TWO

```
1    00000            |Initialize| PROC
2    00000 90000009   adrp   x9, global_0
3    00004 52800028   mov    w8,#1
4    00008 b9000128   str    w8,[x9,PageOffset(global_0)]
5    0000c 9000000a   adrp   x10,global_1
6    00010 52800049   mov    w9,#2
7    00014 b9000149   str    w9,[x10,PageOffset(global_1)]
8    00018 9000000b   adrp   x11, global_2
9    0001c 9000000a   adrp   x12,global_3
10   00020 52800089   mov    w9,#4
11   00024 52800068   mov    w8,#3
12   00028 b9000149   str    w9,[x12,PageOffset(global_3)]
13   0002c b9000168   str    w8,[x11,PageOffset(global_2)]
14   00030 d65f03c0   ret
```

TABLE THREE

```
1    00000            |Initialize| PROC
2    00000 90000008   adrp   x8, global_0
3    00004 52800028   mov    w9,#2
4    00008 5280006a   mov    w10,#3
5    0000c b9000109   str    w9,[x8,PageOffset(global_0)]!
6    00010 9000010a   str    w10,[x8,~#0x8:GpOffset
                              (|global_1-global_0|)]
7    00014 52800089   mov    w9,#4
8    00018 528000aa   mov    w10,#5
9    0001c b9000109   str    w9, [x8,~#0x8:GpOffset
                              (|global_2-global_0|)]
10   00020 b9000 10a  str    w10,[x8,~#0x8:GpOffset
                              (|global_3-global_0|)]
11   00024 d65f03c0   ret
```

As shown in Table Two, four ADRP instructions are used to form the address of the same 4 KB page where each of the global variables are located. By contrast, the same program shown in Table One is transformed into the intermediate code representation shown in Table Three where only one ADRP instruction is used to form the address of the 4 KB page common to all the global variables.

As shown in Table Three, the ADRP instruction in line 2 forms the address of the 4 KB page in register x8. The STR instruction in line 5 adds the page offset of global_0 to register x8 thereby forming the address of global_0. The STR instruction in line 6 adds an offset to register x8 to form the address of global_1 as the difference between the offset of global_1 and the offset of global_0. Similarly, the STR instruction in line 9 adds an offset to register x8 to form the address of global_2 as the difference between the offset of global_2 and the offset of global_0. The STR instruction in line 10 adds an offset to register x8 to form the address of global_3 as the difference between the offset of global_3 and the offset of global_0.

As shown above in Table Three, the techniques described herein eliminate redundant ADRP instructions used to generate the addresses of global variables that reside within the same memory page.

Compilation System

Attention now turns to FIG. 1 which illustrates an exemplary system 100 configured to generate the addresses of global variables without redundant instructions. FIG. 1 shows an exemplary configuration of a system 100 that includes a language compiler 102, a backend compiler 104, and a linker 106. The system 100 utilizes a language compiler 102 that transforms one or more source code files 110 written in a programming language into an assembly file 112. The language compiler 102 translates statements written in a programming language into an intermediate language code (IR) based on the grammar associated with the programming language. Exemplary programming languages include, without limitation, Visual Basic, Visual J #, C++, C #, APL, Cobol, Pascal, C, Java, and the like. Intermediate language code is a processor-independent form of a program consisting of binary instructions. An exemplary intermediate language code is the Common Intermediate Language (CIL) which is defined by the Common Language Infrastructure used by the .NET framework, also known as the Microsoft Intermediate Language (MSIL). Other exemplary intermediate language code include Java® bytecodes, Parrot intermediate representation, Technology Independent Machine Interface (TIMI), and the like. Non-intermediate language code are files formatted as .txt, .html, .xml, interpreted script files, and source code files.

In one aspect of the disclosure, the language compiler 102 compiles the source code files 110 into an assembly file 112 or assembly that is composed of metadata and intermediate language code. The metadata includes a symbol table (not shown) that includes the variables used in the program including the global variables. A global variable or global symbol is a variable in a source code program that is visible throughout the entire program thereby having a global scope. The assembly file 112 is a binary file that includes a section for the intermediate language code or instructions and a data section that includes the global variables.

The assembly file 112 is then used by the backend compiler 104 to generate machine instructions for a targeted processor in an object code file 114. The backend compiler 104 performs the processing that relates to the target architecture, such as code optimization, register allocation, and code generation. The backend compiler 104 may include a pre-pass component 116 and a code generation component 118. The pre-pass component 116 may include a reader module 120 and an analyzer module 122 that are configured to generate a global variable order list 124. The reader module 120 reads in the assembly file 112 so that the analyzer module 122 can generate the layout graph (not shown) and the global variable order list 124.

The code generation component 118 includes a reader module 125, a code optimization module 126, a register allocation module 128, and a code generator module 130. The reader module 125 reads the global variable order list 124 and the assembly file 112 so that the code optimization module 126 may perform optimizations on the instructions. The code optimization module 126 may perform any one or more of the well-known code optimizations such as without limitation, branch elimination, loop collapsing, instruction combining, constant folding, constant propagation, dead code elimination, integer divide optimization, expression simplification, loop fusion, inlining, invariant expression elimination, strength reduction, loop unrolling, and so forth.

The register allocation module 128 assigns variables to registers and handles the transfer of data in and out of registers. The code generator module 130 converts the optimized intermediate language code into machine instructions into an object code file 114.

The object code file 114 may then be linked with other object code files (e.g., libraries) through a linker 106 into a corresponding image file 132 or executable file. The linker 106 updates the object code files 114 with relative virtual addresses replacing the relative addresses thereby generating the image file 132.

In another aspect, the system 100 may include a profiling compiler 107 and an execution engine 109. The profiling compiler 107 is configured to construct an executable file that includes instructions to measure the frequency that each global variable in each function is used. This executable file is executed by the execution engine 109 one or more times to generate profile data 113 that includes the runtime usage of the global variables in the program. This profile data 113 may then be input to the pre-pass component 116 for use in calculating the weights of the layout graph.

Attention now turns to descriptions of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
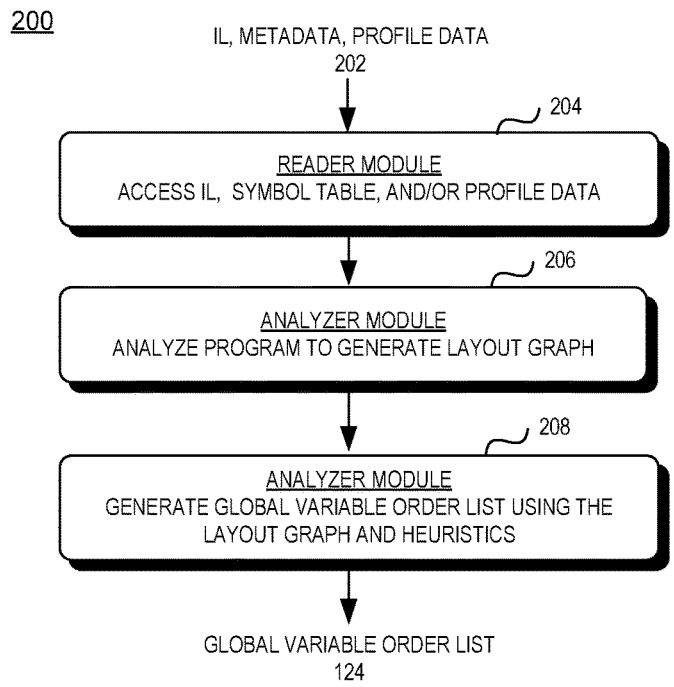
FIG. 2 is a flow diagram illustrating an exemplary method for generating a layout graph of a program and a global variable order list.

Turning to FIG. 2, there is shown an exemplary method for generating the global variable order list 124. In the pre-pass phase, the pre-pass reader module 120 reads in the intermediate language code, the symbol table from the metadata, and/or the profile data (collectively 202) (block 204). The analyzer module 122 generates a layout graph from which the global variable order list is generated (block 206). A layout graph is a control flow graph that represents the calling relationships between methods (i.e., methods, subroutines) in a program. A node in the layout graph represents a method and the edge from one node to another node represents the calling relationship between the two methods. Each node in the graph is associated with a list of the global variables used in the method along with a weight for each global variable. In one aspect, the weight can be the frequency in which each global variable is referenced in a function or method. The weights can include static weights from a static analysis of the program. The static weights are the counts of the frequency of usage of each global variable from a static code analysis. The static code analyses are performed without executing the program. Alternatively, the weights can include runtime weights obtained from the profile data and/or any combination of the runtime weights and the static weights.

The analyzer module 122 uses the layout graph with the weights to generate the global variable order list 124 (block 208). The global variables are ordered in a sequence with the global variable with the highest weight first with the global variable with the lowest weight last. In the case where two or more global variables that have the same weight, then the global variable with the highest alignment precedes the other global variables with the same weight. In the case where two or more global variables have the same weight and alignment, then the global variable with the smallest size takes precedence over the other global variables with the same weight and alignment. Hence, the global variable order list is a ranked order of all the global variables in a program based on usage, alignment and the size of a global variable.

The analyzer module 122 then uses rules or heuristics to divide the global variable order list into groups where each group contains those global variables more likely to be situated in the same memory page. In one aspect, the analyzer module 122 aggregates global variables in the global variable order list within the same function into a group. The analyzer module 122 then checks if the global variables with a group need to be split into one or more additional groups such as when the global variables within a group may exceed a memory page boundary.

For example, if the difference in the offsets of two consecutive global variables in the global variable order list is 12-bits or less, then the two consecutive global variables can remain in the same group. This is because the ADD instruction adds a 12-bit offset to the base address which has an address range within 4 KB. However, if a LDR or STR instruction is used, then the analyzer module 122 determines whether to consecutive global variables can remain in a group based on the size of the global variable.

Figure 3:
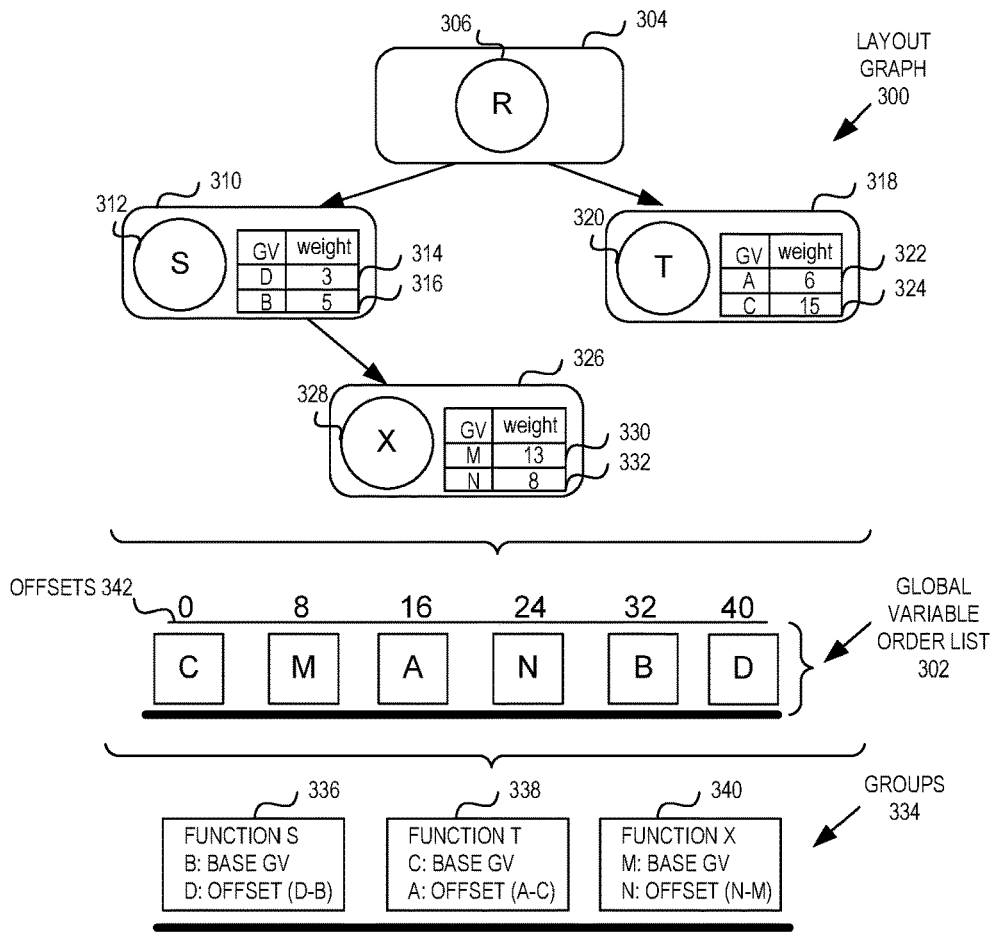
FIG. 3 is an exemplary diagram of a layout graph and a global variable order list.

Referring to FIG. 3, there is shown an exemplary layout graph 300, a corresponding global variable order list 302, and the groups 334 corresponding to the global variable order list. The layout graph 300 contains a node for each function and an edge from one node to another node represents a calling relationship between the connected functions. As shown in FIG. 3, node 304 represents the function R. Function R 306 calls function S 312 in node 310 and function T 320 in node 318. Function S 312 calls function X 328 in node 326.

The function R 306 does not reference any global variables. Function S 312 uses two global variables, D and B, where global variable D is used 3 times 314 in function S and global variable B is used 5 times 316 in function S. The function T 310 uses two global variables A and C, where global variable A is used 6 times 322 in function T and global variable C is used 15 times 324 in function T. Function X 328 references global variable M 13 times 330 and references global variable N 8 times 332.

The global variable order list 302 orders all the global variables in the entire program in an order from the most weighted global variable to the lowest weighted global variable. As shown in FIG. 3, the global variables are listed in the following order: C, M, A, N, B and D where C has the weight 15, M has the weight 13, A has the weight 6, N has the weight 8, B has the weight 5, and D has weight 3.

Associated with each global variable is an offset that is based on a global variable's position within the global variable order list 302 and the global variable's size. In the example shown in FIG. 3, the size of each global variable is 8 bytes. The offsets for the global variables shown in FIG. 3 is shown in line 342. The offset for global variable C is 0 bytes since it is the first global variable in the program. The offset for each succeeding global variable in the global variable order list 302 is based on its distance from the first global variable in the global variable order list 302 and its size. The offset for global variable M is 8 bytes, the offset for global variable A is 16 bytes, the offset for global variable N is 24 bytes, the offset for global variable B is 32 bytes, and the offset for global variable D is 40 bytes.

The size of a global variable may not always be the same. For example, if C is 8 bytes, M is 4 bytes, A is 32 bytes, N is 16 bytes, B is 80 bytes, and D is 4 bytes, the order of the global variables in the global variable order list would remain the same but the offsets would be different. Global variable C would start at 0 bytes, global variable M would start at 8 bytes (offset 8 bytes), global variable A would start at 16 bytes (offset 16 bytes), global variable N would start at 48 bytes (offset 48 bytes), global variable B would start at 64 bytes (offset 64 bytes), and global variable D would start at 72 bytes (offset 72 bytes).

Next, the global variables are aggregated into groups where each group contains the global variables used in a function. As shown in FIG. 3, there are three groups 336, 338, and 340. There is no group associated with function R since function R does not contain any global variables. Group 336 contains the global variables associated with function S. In function S, global variable B is the base global variable since it has a higher weight than global variable D. As the base global variable, the address of global variable D is fully resolved using an ARDP instruction to generate the base address of its memory page. The address of global variable B would utilize an offset which is the difference between the position of global variable D in the global variable order list from the position of global variable B in the global variable order list. In the example shown in FIG. 3, the size of each global variable is 8 bytes. The offset for global variable would be 40 bytes–32 bytes or 8 bytes.

For the function T, the group 338 would include the global variable C as the base global variable since its weight is 15 which exceeds the weight of global variable A whose weight in 6. There would be an ADRP instruction generated to load the base address of the memory page containing base global variable C. The offset used in an ADD instruction for global variable A would be the difference in the position of global variable A in the global variable order list from the position of global variable C in the global variable order list which is 16 bytes–0 bytes or 16 bytes.

For the function X, the group 340 would include global variable M as the base global variable since its weight is higher than global variable N. There would be an ADRP instruction to load the base address of the memory page containing base global variable M. The offset used in an ADD instruction for global variable N would be the difference in the position of global variable N in the global variable order list from the position of global variable M in the global variable order list which is 24 bytes–8 bytes or 16 bytes.

Figure 4:
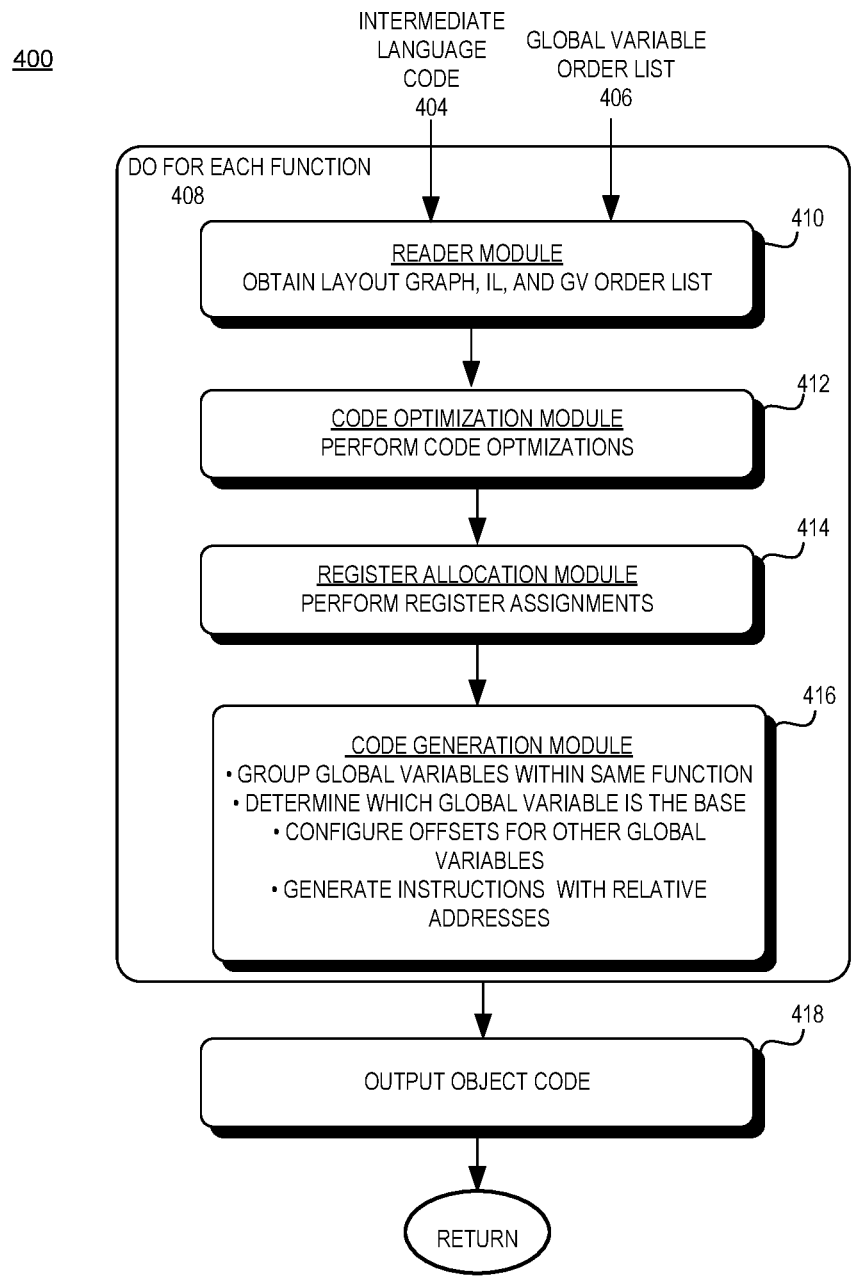
FIG. 4 is a block diagram illustrating an exemplary method for transforming intermediate language code into object code.

Attention now turns to FIG. 4 which describes in further detail the method 400 of the code generation component 118. The reader module 124 of the code generation component 118 receives the intermediate language code 404 and the global variable order list 406 (block 410). For each function, the code optimization module 126 performs code optimizations (block 412), the register allocation module 128 performs register allocations (block 414), and the code generator module 130 generates machine instructions (block 416).

The code generator module 130 uses the global variable order list 406 to group the global variables within the same function in the order of the global variable order list. A single global variable is selected as the base global variable whose address is fully resolved. For example, for an ARM64 architecture, the code generator module would generate a ADRP/ADD pair of instructions to load the address of the base global variable. For the remaining global variables in the group, an ADD, STR or LDR instruction would be generated that adds an offset to the address of the base global variable. The offset is the difference between the position of the remaining variable in the global variable order list from the position of the base global variable in the global variable order list. (collectively, block 416). After all the functions are processed, the code generator module outputs an object code file which includes machine instructions with relative addresses (block 418).

A relative address is a virtual address of an object with respect to the start of the function where the object is used. The linker then replaces the relative address with relative virtual addresses which are relative to the start of the image file.

Figure 5:
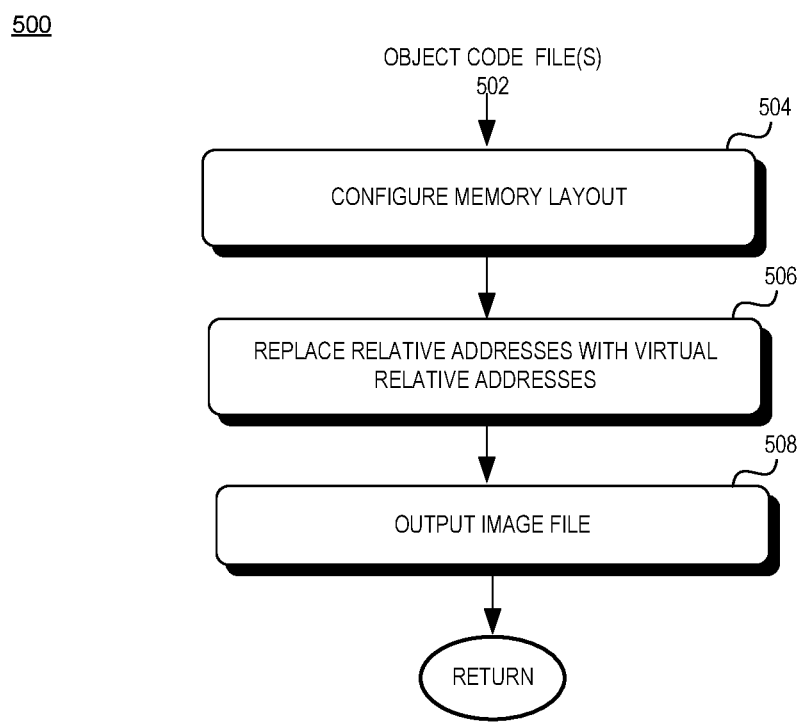
FIG. 5 is a block diagram illustrating an exemplary method of a linker that transforms relative addresses into relative virtual addresses.

Attention now turns to FIG. 5 which illustrates the operation of the linker 500 which receives one or more object files associated with the program and generates an executable file referred to as an image file. The image file contains relative virtual addresses (RVA) which differ from standard virtual addresses. A relative virtual address is relative to where the image file will be loaded into memory in the intended target machine. A relative virtual address is a virtual address of an object where the file will be loaded into the memory of the target device minus the base address of the image file.

The linker receives one or more object code files 502 associated with a program and aggregates the object code files into a single executable and configures a memory layout for the aggregated file (block 504). The linker then replaces the relative addresses in the machine instructions with relative virtual addresses (block 506) and outputs an image file (step 508).

Technical Effect

Aspects of the subject matter disclosed herein pertain to the technical problem of reducing the number of instructions needed to generate the addresses of global variables. The problem is pertinent to RISC-based architectures that utilize 32-bit instructions which are not sufficient to address global variables having 32-bit addresses. The technical features associated with addressing this problem involve a compiler that analyzes a program by generating a layout graph that includes each function the program and weights for each global variable used in a function. The layout graph is used by the compiler to generate a global variable order list that lists each global variable in the program in a specific order. The global variables are aggregated into groups, where each group represents those global variables that are most likely to be located in close proximity to each other. A base global variable is selected from the group whose address is fully resolved. The addresses of the remaining global variables in the group are configured as offsets that are based on their position in the global variable ordered list with respect to a position of the base global variable. In this manner, a single instruction is generated for the base address of a common memory page shared by the global variables within a group.

Examples of Suitable Computing Environments

Figure 6:
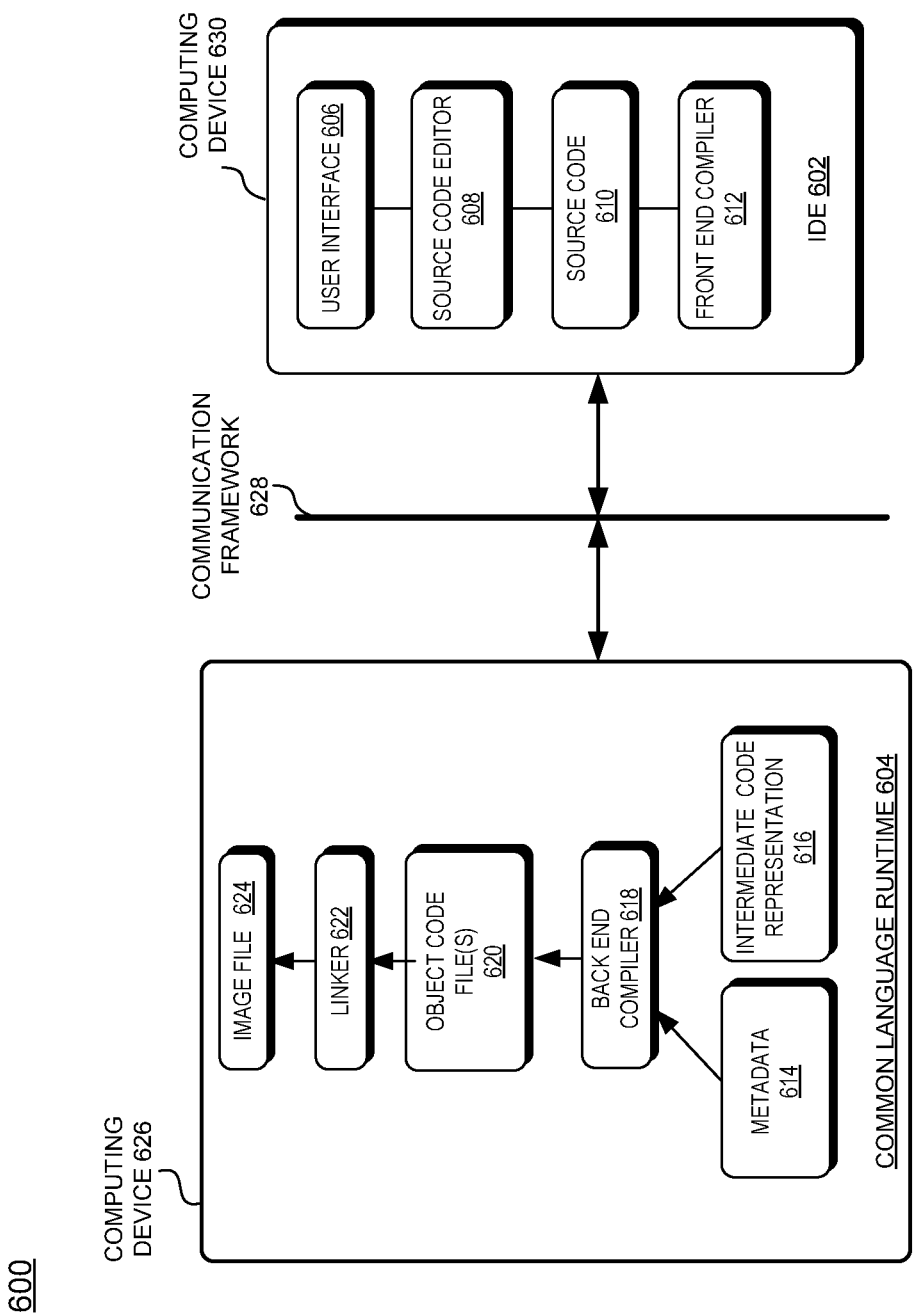
FIG. 6 is a block diagram illustrating a first exemplary computing or operating environment.

Attention now turns to a discussion of exemplary operating environments. FIG. 6 depicts a first exemplary operating environment 600 that includes an integrated development environment ("IDE") 602 and a common language runtime ("CLR") 604. The IDE 602 (e.g., Visual Studio, NetBeans, Eclipse, JetBrains, NetCode, etc.) may allow a user (e.g., developer, programmer, designer, coder, etc.) to design, code, compile, test, run, edit, debug or build a program, set of programs, web sites, web applications, packages, and web services in a computing device. Software programs include source code 610 created in one or more source code languages (e.g., Visual Basic, Visual J #, C++. C #, J #, Java Script, APL, COBOL, Pascal, Eiffel, Haskell, ML, Oberon, Perl, Python, Scheme, Smalltalk and the like).

The IDE 602 may provide a native code development environment or may provide a managed code development that runs on a language virtual machine or may provide a combination thereof. The IDE 602 may provide a managed code development environment using the .NET framework that may include a user interface 606, a source code editor 608, and a language or front-end compiler 612. A user can create and/or edit the source code according to known software programming techniques and the specific logical and syntactical rules associated with a particular source language via the user interface 606 and the source code editor 608 in the IDE 602. Thereafter, the source code 610 can be compiled via a front end compiler 612, whereby an intermediate code representation 616 of the program and metadata 614 is created.

One or more object code files 620 are created using a language specific compiler 612 from the intermediate code representation 614 and the metadata 614 when the program is executed. In one aspect, when the intermediate code representation 616 is executed, it is compiled while being executed into the appropriate machine language for the platform it is being executed on, thereby making the image file 624 portable across multiple platforms. Alternatively, in other aspects, the object code files 620 may be compiled to native code machine language and linked to generate an image file appropriate for its intended platform.

In one aspect of the invention, the IDE 602 may operate on a first computing device 630 and the CLR 604 may operate on a second computing device 626 that is distinct from the first computing device 630. In another aspect of the invention, the IDE 602 and CLR 604 may operate on the same computing device. The computing devices 626, 630 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

The first and second computing devices 626, 630 may be communicatively coupled through a communication framework 628. The communication framework 628 facilitates communications between the computing devices. The communications framework 628 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

Although the foregoing operating environment has been described with respect to the .NET framework, the technology described herein is not constrained to any particular software framework, programming language, compiler collection, operating system, operating system platform, compiler infrastructure project, and the like. The techniques described herein can be employed in the GNU compiler collection (GCC) and the Low-Level Virtual Machine (LLVM) compiler infrastructure and other compiler and operating systems.

Figure 7:
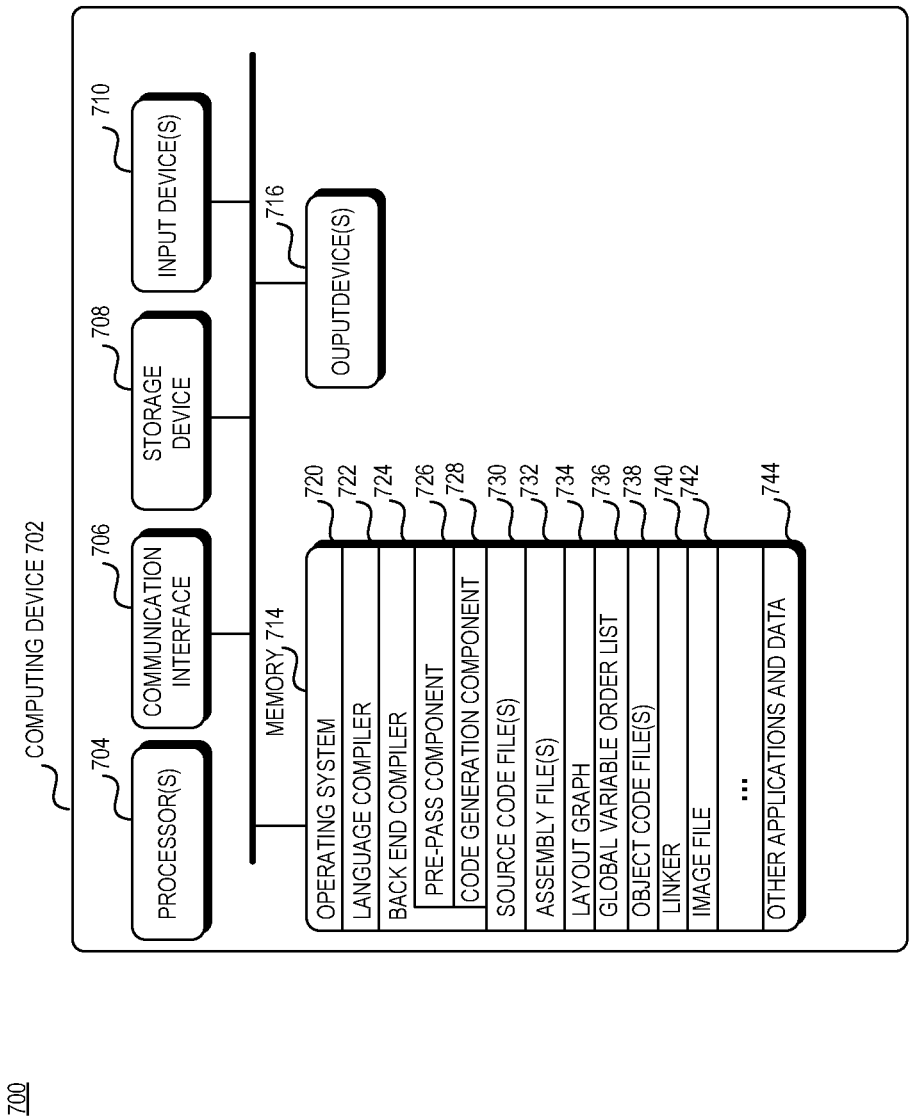
FIG. 7 is a block diagram illustrating a second exemplary computing or operating environment.

Attention now turns to FIG. 7 and a discussion of a second exemplary operating environment. It should be noted that the operating environment 700 is exemplary and is not intended to suggest any limitation as to the functionality of the embodiments. The embodiments may be applied to an operating environment 700 utilizing at least one computing device 702. The computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

The computing device 702 may include one or more processors 704, a communication interface 706, a storage device 708, one or more input devices 710, one or more output devices 716, and a memory 714. A processor 704 may be any commercially available processor and may include dual microprocessors and multi-processor architectures. The communication interface 706 facilitates wired or wireless communications between the computing device 702 and other devices. The storage device 708 may be computer-readable medium that does not contain propagating signals, such as modulated data signals transmitted through a carrier wave. Examples of the storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The input devices 710 may include a keyboard, mouse, pen, voice input device, touch input device, etc., and any combination thereof. The output devices 716 may include a display, speakers, printers, etc., and any combination thereof.

The memory 714 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 714 may also include one or more external storage devices or remotely located storage devices that do not pertain to propagated signals, such as modulated data signals transmitted through a carrier wave.

The memory 714 may contain instructions, components, and data. A component is a software program that perform a specific function and is otherwise known as a module, application, and the like. The memory 714 may include an operating system 720, a language compiler 722, a backend compiler 724 having a pre-pass component 726 and a code generation component 728, one or more source code files 730, one or more assembly files 732, a layout graph 734, a global variable order list 736, one or more object files 738, a linker 740, an image file 742, and various other applications, components, and data 744.

Figure 8:
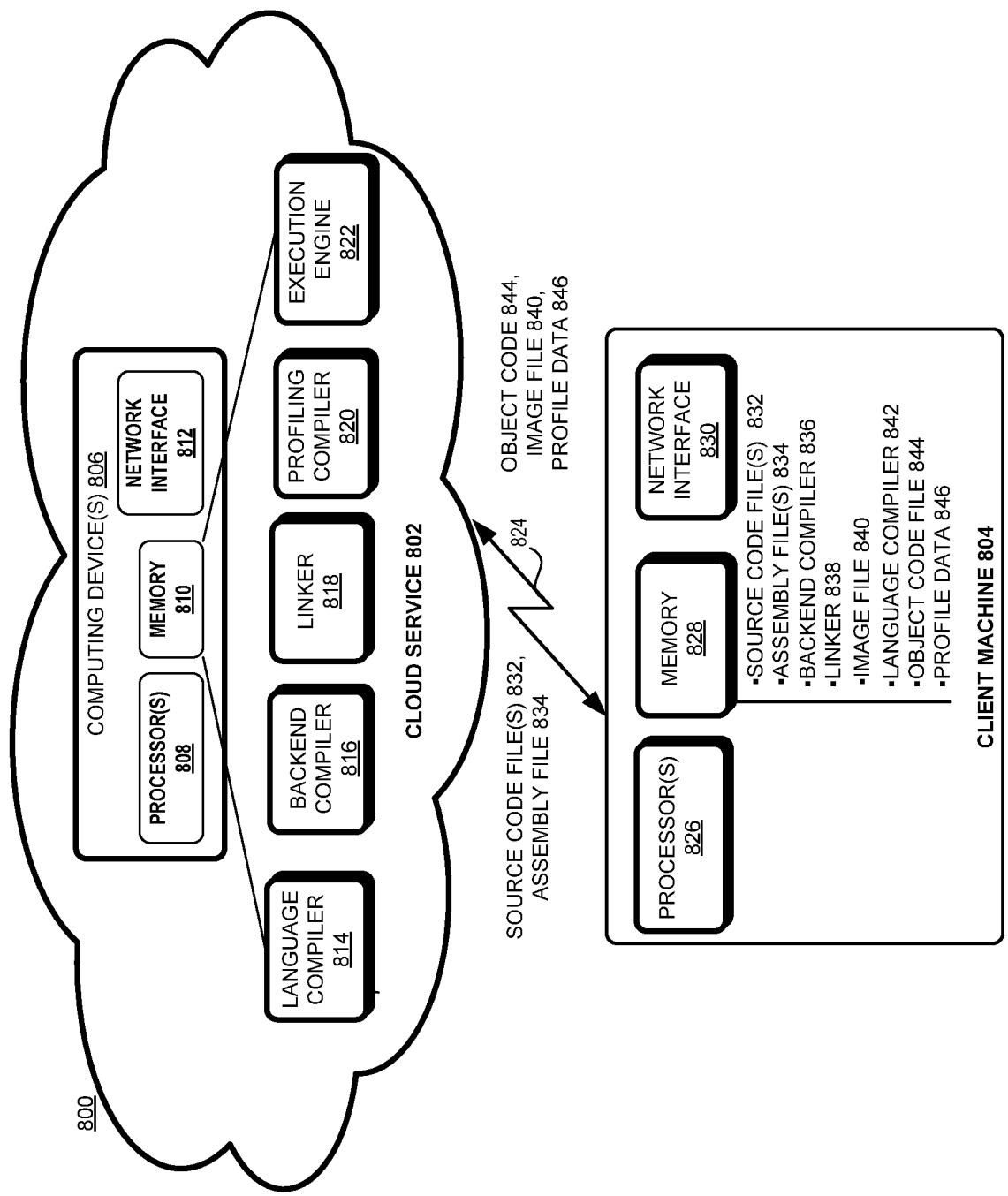
FIG. 8 is a block diagram illustrating a third exemplary computing or operating environment.

Attention now turns to FIG. 8 and a discussion of a third exemplary operating environment 800. It should be noted that the operating environment 800 is exemplary and is not intended to suggest any limitation as to the functionality of the embodiments. The embodiment shown in FIG. 8 pertains to a cloud service 802 that provides on-demand compilation services for users interacting with the cloud service 802 from a client machine 804. In this operating environment, the cloud service 802 may be embodied as a data center having a group of physical computing machines that communicate via a network to one or more client machines. Alternatively, the cloud service 802 may be configured as a pool of hardware (e.g., computing resources, network resources, storage resources) and software resources configured to provision, create and manage virtual machines and their operating systems to provide the on-demand compilation services. The cloud service 802 may have one or more computing devices 806, each including one or more processors 808, a memory 810, and a network interface 812. The memory 810 may store a language compiler 814, a backend compiler 816, a linker 818, a profiling compiler 820, and an execution engine 822 which operate as described above.

The compilation services provided by the cloud service 802 may be, without limitation, to generate an image file or object file having reduced instructions to load the addresses of global variables using the techniques described herein. The cloud service 802 may provide any number of a variety of services, such as, without limitation, compiling source code files into an object code file or image file, creating an object code file or image file from an assembly file, generating profile data for a program, compiling an assembly file where the source files were compiled on the client machine, and so forth. The cloud service 802 may receive one or more source code files and/or an assembly file from a client machine and may return to the client machine one or more of an image file, an object code file and/or profile data.

The cloud service 802 interacts through a network 824 with one or more client machines 804, whose users request the compilation services of the cloud service 802. The network 824 may be any type of communication medium such as without limitation, local area networks, wide area networks and can utilize any type of communication protocol (i.e., wired or wireless). The computing devices 806 of the cloud service 802 and the client machine 804 may consist of a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

A client machine 804 may include one or more processors 826, a memory 828, and a network interface 830 enabling communications between the cloud service 802 and the client machine 804 as described above. In one aspect, the memory 828 of the client machine 804 may store one or more source code files 832, one or more assembly files 834, a backend compiler 836, a linker 838, an image file 840, a language compiler 842, an object code file 844 and profile data 846.

In accordance with aspects of the subject matter described herein, a computer system can include one or more processors and a memory connected to the one or more processors. The system can include a compiler executing on the at least one processor that generates a ranked order of one or more global variables in a program based on usage of the one or more global variables in the program, forms a group of select ones of the one or more global variables that are used within a same function of a program, selects a base global variable from a group having a highest rank in the ranked order, and generates a first instruction to load a base address of a memory page of the base global variable, a second instruction to add a first offset to the base address to generate an address of the base global variable, and a third instruction to add a second offset to the address of the base global variable to generate an address of a second global variable within the same function of the program.

In one aspect, the usage of the one or more global variables in the program is determined from a static analysis of the program and in other aspect the usage of the one or more global variables in the program is determined from profile data of runtime executions of the program. In one aspect, the ranked order is based on alignment and size of the one or more global variables. Each global variable in the ranked order is associated with a position in the ranked order that represents a distance from a first global variable in the ranked order. The distance from the first global variable is based on a size and alignment of global variables within the ranked order. The second offset is based on a different in position of the second global variable in the ranked order from the position of the first global variable in the ranked order.

A device can include at least one processor and a memory connected to the at least one processor. The device includes a compiler that generates a plurality of executable instructions that when executed on the at least one processor generates an address of a first global variable using an ADRP instruction paired with a corresponding ADD instruction in a first register, the ADRP instruction loads a base address of a memory page of the first global variable and the corresponding ADD instruction adds an offset that indicates a position of the first global variable in the memory page, the executable file including a subsequent ADD instruction configured to add an offset to the first register to generate an address of a second global variable within the memory page.

The ADRP instruction includes a 20-bit page address common to both the first global variable and the second global variable and the subsequent ADD instruction adds a 12-bit offset to the address in the first register to generate the address of the second global variable. An offset of the subsequent ADD instruction is based on an estimated difference in position of the first global variable and a position of the second global variable in a same memory page. The estimated difference in the position of the first global variable and the position of the second global variable is based on respective positions in a global variable order list, wherein the global variable order list ranks global variables in a program based on frequency of usage. The frequency of usage is from a static analysis of the program and/or from profile data. The first global variable and the second global variable are used in a same function within a program.

A method using a system and device, such as the system and device described above, generates an address of a first global variable using a first instruction that loads a first portion of the address of a first global variable and a second instruction that loads a second portion of the address of the first global variable, determines that a second global variable resides in a same memory page as the first global variable; and generates an address of a second global variable using a third instruction by adding an offset into the address of the first global variable, wherein the offset is based on distance from the second global variable from the first global variable in a global variable order list and the global variable order list includes an order of global variables used in a program based on frequency of usage.

In one aspect, the first portion of the address is a base address of the same memory page. The second portion of the address is a location of the first global variable within the same memory page. The first instruction, the second instruction, and the third instruction are 32-bit instructions and the address of the first global variable and the address of the second global variable are 32-bits in length. The first portion of the address is 20-bits, the second portion of the address is 12-bits, and the offset is 12-bits. The frequency of usage of a global variable is based on a static analysis of the program and/or profile data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
    a processor and a memory;
    wherein the memory includes a compiler having instructions that when executed by the processor perform acts that:
        receive, through a network from a client machine, a source code program having a plurality of global variables;
        order the plurality of global variables in a global variable list, wherein the global variable order list includes a ranked order of the plurality of global variables by increasing frequency of usage in the source code program;
        perform one or more code optimizations on the source code program;
        assemble the global variables used within a same function into one or more groups, wherein a group includes the global variables with the same function in the ranked order and which fit within a size of a memory page, each group including a base variable;
        generate an address for each global variable of each group, wherein the base global variable has a fully-resolved address, wherein each of the remaining global variables of a group has an offset relative to the fully-resolved address, wherein each offset is based on a distance from the base global variable in the global variable order list; and
        output an object code file including a plurality of machine instructions having the addresses of the global variables.

2. The system of claim 1, wherein the compiler includes instructions that when executed by the processor perform acts that:
    transmit via the network the object code file to the client machine.

3. The system of claim 1,
    wherein each of the plurality of machine instructions includes a relative address for each global variable.

4. The system of claim 3,
    wherein the memory includes a linker having instructions that when executed on the processor perform acts that:
        replace the relative address for each global variable in each of the plurality of machine instructions with a relative virtual address; and
        output an image file including the plurality of machine instructions with the relative virtual addresses.

5. The system of claim 4, wherein the memory includes a communication program including instructions that when executed on the processor perform acts that:
    transmit the image file to the client machine.

6. The system of claim 1, wherein the memory includes a profile compiler having instructions that when executed on the processor perform acts that:
    execute the source code program to generate profile data, wherein the profile data includes frequency of usage of the global variables in the source code program.

7. The system of claim 1, wherein the compiler includes instructions that when executed on the processor perform acts that:
    produce a layout graph of the source code program, wherein the layout graph includes each function in the source code program and a usage count for each global variable; and
    generate the global variable list from the layout graph.

8. The system of claim 1, wherein the base global variable has a largest frequency of usage within a respective group.

9. A method performed by a compiler, the method comprising:
    generating a global variable order list of global variables in a source code program, wherein the global variable order list is ordered based on frequency of usage of each global variable in the source code program;
    performing a code optimization on the source code program;
    forming one or more groups of the global variables of a function in the source code program, wherein a group includes a base global variable and one or more remaining global variables of the function, wherein the group includes global variables that fit within a memory page, wherein a group incorporates the global variables of the function in a same order as the global variable order list; and
    generating at least one machine instruction to access each of the global variables of the group, wherein the at least one machine instruction for the base global variable of the group has a fully-resolved address, wherein the at least one machine instruction for each remaining global variable of the group has an offset relative to the fully-resolved address of the base global variable, wherein the offset is based on position of the base global variable in the global variable order list.

10. The method of claim 9,
    wherein the memory page has a size of 4 kilobytes,
    wherein a machine instruction has a 32-bit fixed length size.

11. The method of claim 9,
    wherein the at least one machine instruction for the base global variable address includes an ADRP instruction and an ADD instruction,
    wherein the at least one machine instruction for each remaining global variable includes an ADD instruction.

12. The method of claim 9, wherein the at least one machine instruction for the base global variable address and the at least one machine instruction for each remaining global variable based on an Advanced RISC Machine (ARM) architecture.

13. The method of claim 9, wherein the fully-resolved address includes a 20-bit base address of a 4-kilobyte memory page.

14. The method of claim 9, wherein the offset is a 12-bit value.

15. A device, comprising:
a processor and a memory;
wherein the memory includes a profiling compiler and a backend compiler,
wherein the profiling compiler includes instructions that when executed on the processor perform acts to:
generate profile data from at least one execution of a source code program, wherein the profile data includes counts of usage of global variables in the source code program,
wherein the backend compiler includes instructions that when executed on the processor to perform acts to:
order the global variables in increasing usage based on the counts;
form at least one group for each method in the source code program that utilizes at least one global variable, wherein the at least one group selects the global variables in the order of increasing usage, wherein the global variables of each group fit within a size of a memory page;
select a base global variable from the at least one group having a highest usage;
generate an address for the base global variable using an ADRP instruction and an ADD instruction; and
generate an address for each remaining global variable in the at least one group using an ADD instruction, wherein the ADD instruction includes an offset relative to the base global variable address.

16. The device of claim 15, wherein the backend compiler includes instructions that when executed on the processor perform acts that: prior to form the at least one group for each method in the source code program that utilizes at least one global variable, perform code optimizations of the source code program.

17. The device of claim 15, wherein the backend compiler includes instructions that when executed on the processor perform acts to: generate at least one object code file for the source code program.

18. The device of claim 15, wherein the backend compiler includes instructions that when executed on the processor perform acts to: generate at least one object code file for the source code program, wherein the at least one object code file includes machine instructions with relative addresses.

19. The device of claim 18,
wherein the memory includes a linker,
wherein the linker includes instructions that when executed on the processor perform acts to:
replace each relative address with a relative virtual address; and
link each of the at least one object code files of the source code program into an image file, wherein the image file includes machine instructions with relative virtual addresses.

20. The device of claim 19, wherein the machine instructions are ARM64 instructions.

* * * * *